US006417873B1

(12) United States Patent
Fletcher et al.

(10) Patent No.: US 6,417,873 B1
(45) Date of Patent: Jul. 9, 2002

(54) SYSTEMS, METHODS AND COMPUTER PROGRAM PRODUCTS FOR IDENTIFYING COMPUTER FILE CHARACTERISTICS THAT CAN HINDER DISPLAY VIA HAND-HELD COMPUTING DEVICES

(75) Inventors: James Corvin Fletcher, Apex; David Bruce Lindquist, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,308

(22) Filed: Dec. 11, 1998

(51) Int. Cl.⁷ .............................. G06F 3/14; G09G 5/00
(52) U.S. Cl. ................... 345/853; 345/864; 345/746; 345/738; 707/501.1
(58) Field of Search .................... 345/853, 855, 345/864, 746, 733, 738, 744, 747, 760, 765, 762, 778, 440, 739, 854; 707/501.1, 513, 514, 515; 709/203, 220, 228, 246

(56) References Cited

U.S. PATENT DOCUMENTS

| 5,224,098 A | | 6/1993 | Bird et al. ................... 709/233 |
| 5,339,434 A | * | 8/1994 | Rusis ........................... 709/246 |
| 5,696,885 A | | 12/1997 | Hekmatpour ................. 706/59 |
| 5,720,007 A | | 2/1998 | Hekmatpour ................. 706/250 |
| 5,787,252 A | | 7/1998 | Schettler et al. ............ 709/224 |
| 5,790,855 A | | 8/1998 | Faustini ....................... 717/100 |
| 5,815,661 A | * | 9/1998 | Gosling .................. 709/246 X |
| 5,944,790 A | * | 8/1999 | Levy ....................... 709/228 X |
| 5,963,208 A | * | 10/1999 | Dolan et al. ................. 345/760 |
| 6,069,630 A | * | 5/2000 | Lisle et al. .............. 345/854 X |
| 6,081,815 A | * | 6/2000 | Spitznagel et al. ....... 707/501.1 |
| 6,144,962 A | * | 11/2000 | Weinberg et al. ........ 345/760 X |
| 6,189,019 B1 | * | 2/2001 | Blumer et al. |
| 6,212,564 B1 | * | 4/2001 | Harter et al. ................ 709/228 |
| 6,249,844 B1 | * | 6/2001 | Schloss et al. .......... 707/513 X |

OTHER PUBLICATIONS

Bulletin, Checking Graphs for Soft Structures, IBM Technical Disclosure Bulletin, vol. 38, No. 08 (Aug. 1995).

* cited by examiner

Primary Examiner—Raymond J. Bayerl
(74) Attorney, Agent, or Firm—Myers Bigel Sibley & Sajovec; Jeanine S. Ray-Yarletts (57) ABSTRACT

Systems, methods and computer program products for identifying files from among a plurality of hierarchically-related files within a web site, wherein each of the identified files has one or more characteristics that can hinder display thereof via a hand-held computing device. Operations include selecting a file from among the plurality of hierarchically-related files. The selected file and files hierarchically-related to the selected file are then analyzed via a web crawler configured to identify characteristics that can hinder display of a respective file within a display of a hand-held computing device. A directed graph representation of the plurality of hierarchically-related files can be displayed that identifies each file having a characteristic that can hinder display thereof via a hand-held computing device.

45 Claims, 4 Drawing Sheets

SYSTEMS, METHODS AND COMPUTER PROGRAM PRODUCTS FOR IDENTIFYING COMPUTER FILE CHARACTERISTICS THAT CAN HINDER DISPLAY VIA HAND-HELD COMPUTING DEVICES

FIELD OF THE INVENTION

The present invention relates generally to computer files and, more particularly, to the display of computer files.

BACKGROUND OF THE INVENTION

The Internet is a worldwide decentralized network of computers having the ability to communicate with each other. The Internet has gained broad recognition as a viable medium for communicating and interacting across multiple networks. The World Wide Web (Web) was created in the early 1990's, and is comprised of server-hosting computers (web servers) connected to the Internet that have hypertext documents or web pages stored therewithin. Web pages are accessible by client programs (i.e., web browsers) utilizing the Hypertext Transfer Protocol (HTTP) via a Transmission Control Protocol/Internet Protocol (TCP/IP) connection between a client-hosting device and a server-hosting device.

An intranet is a private computer network conventionally contained within an enterprise and that conventionally includes one or more servers in communication with multiple user computers. An intranet may be comprised of interlinked local area networks and may also use leased lines in a wide-area network. An intranet may or may not include connections to the outside Internet. Intranets conventionally utilize various Internet protocols and, in general, often look like private versions of the Internet. An intranet user conventionally accesses an intranet server via a web browser running locally on his/her computer.

Exemplary web browsers for both Internet and intranet use include Netscape Navigator® (Netscape Communications Corporation, Mountain View, Calif.) and Internet Explorer® (Microsoft Corporation, Redmond, Wash.). Web browsers typically provide a graphical user interface for retrieving and viewing information, applications and other resources hosted by Internet/intranet servers (hereinafter collectively referred to as "web servers" or "web sites").

Web content including, but not limited to, information, applications, applets and other video and audio resources (collectively referred to herein as "files") are conventionally delivered from a web server to a web browser on a user's computer in the form of web pages. As is known to those skilled in this art, a web page is conventionally formatted via a standard page description language such as HyperText Markup Language (HTML), and typically displays text and graphics, and can play sound, animation, and video data. HTML provides basic document formatting and allows a web content provider to specify hypertext links (typically manifested as highlighted text) to other servers and files. When a user selects a particular hypertext link, a web browser reads and interprets the address, called a Uniform Resource Locator (URL) associated with the link, connects the web browser with the web server at that address, and makes an HTTP request for the file identified in the link. The web server then sends the requested file to the client in HTML format which the browser interprets and displays to the user.

With the increasing mobility of today's society, the demand for mobile computing capabilities has also increased. Many workers and professionals are downsizing their laptop computers to smaller palm-top or hand-held devices, such as personal digital assistants (PDAs). In addition, many people now utilize cellular telephones to access the Internet and to perform various other computing functions. Hand-held computing devices including, but not limited to, PDAs, cellular telephones, and computing devices utilized within appliances and automobiles, are often collectively referred to as "pervasive" computing devices. Many hand-held computing devices utilize the Microsoft® Windows CE and 3Com Palm Computing® platforms.

Unfortunately, hand-held computing devices may have displays that are small in size compared with desktop computer displays. As a result, images and text otherwise displayable on a desktop computer display may not be displayable on a hand-held computing device display. For example, a desktop computer display having an array of 1024 pixels by 800 pixels may be able to display a large (e.g., 2 megabit), 32 bit per pixel color image. A hand-held computing device with a display having an array of 120 pixels by 120 pixels and with the ability to display only about 3 bits per pixel, may ignore much of the image data. As a result the image may not be displayed properly, if at all, via the hand-held computing device display. Furthermore, text within a file may have a particular font or size that can hinder the display thereof within a hand-held computing device display.

Files that may not be displayable via a hand-held computing device display can typically be transformed into a format that is displayable within a hand-held computing device display. For example, large, high resolution, color images can be transformed into small, black and white images that can be displayed within small, low resolution displays. Furthermore, because some web servers can recognize the type of client device requesting a file, files in the proper format for display via the requesting client device can be provided.

Unfortunately, an enormous number of files can reside within a web site on both the Internet and on intranets. Furthermore, an enormous number of files are added every day to web sites. As a result, the task of identifying files within a web site having characteristics that can hinder the display thereof via a hand-held computing device, may be difficult.

SUMMARY OF THE INVENTION

In view of the above discussion, it is an object of the present invention to facilitate the identification of web site files that may be difficult to display via hand-held computing devices.

It is another object of the present invention to facilitate the identification of web site files having one or more characteristics that do not comply with other files within a web site.

These and other objects of the present invention are provided by systems, methods and computer program products for identifying files, such as web pages, from among a plurality of hierarchically-related files within a web site, wherein each of the identified files has one or more characteristics that can hinder or prohibit display thereof via a hand-held computing device in communication with the web site. Operations include selecting a file from among a plurality of hierarchically-related files within a web site. The selected file and files hierarchically-related to the selected file are then analyzed via a web crawler configured to identify characteristics that can hinder display of a respective file within a display of a hand-held computing device. For example, the size, font, style and language of text within a file can be analyzed. Also, the format and size of image files can be analyzed.

A directed graph representation of the plurality of hierarchically-related files within a web site is then displayed. Each file having at least one characteristic that can hinder or prohibit display thereof via a hand-held computing device is identified within the directed graph representation. Suggestions as to how to transform an identified file so as to be displayable via a hand-held computing device may also be provided.

According to another embodiment, the present invention may be utilized to determine whether files within a web site comply with a style and/or format. For example, using the present invention, a determination can be easily made whether all web pages within a web site contain text in English.

The present invention can be advantageous because web content providers can quickly and easily identify files having one or more characteristics that may render the display thereof difficult or impossible via a hand-held computing device. Furthermore, the present invention can provide web content providers with suggested formats into which files can be transformed so as to be displayable via a hand-held computing device.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention is preferably written in an object oriented programming language such as Java®, Smalltalk or C++. However, the computer program code for carrying out operations of the present invention may also be written in conventional procedural programming languages, such as the "C" programming language. The program code may execute entirely on the user's computer, as a stand-alone software package, or it may execute partly on the user's computer and partly on a remote computer. In the latter scenario, the remote computer may be connected to the user's computer through a LAN or a WAN, or the connection may be made to an external computer (for example, through the Internet using an Internet Service Provider).

The present invention is described below with reference to flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 1A:
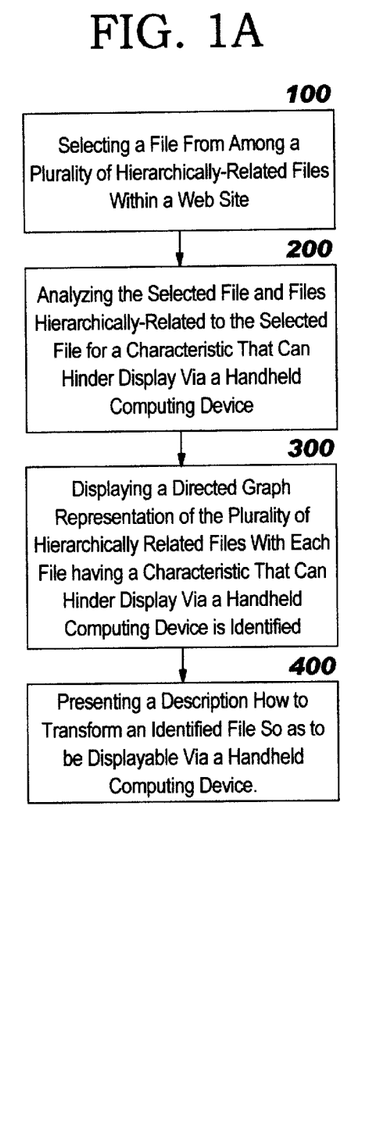
FIGS. 1A–1C schematically illustrate operations according to the present invention for identifying files from a plurality of hierarchically-related files within a web site wherein each identified file has at least one characteristic that can hinder display thereof via a hand-held computing device.
Figure 1B:
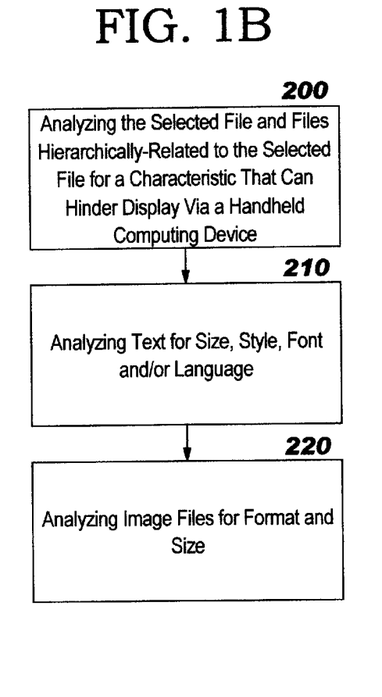
Figure 1C:
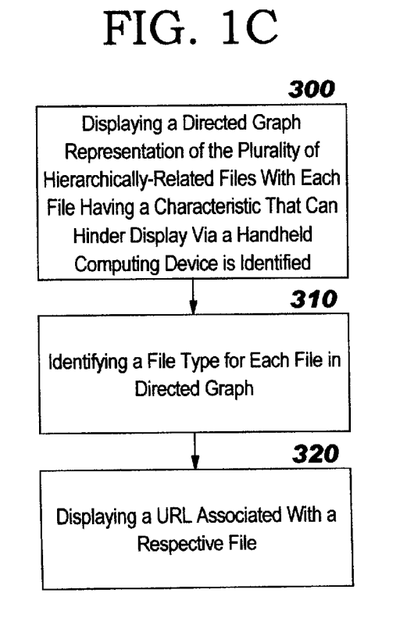

Referring now to FIGS. 1A–1C, operations according to the present invention for identifying files from a plurality of hierarchically-related files within a web site wherein each identified file has at least one characteristic that can hinder display thereof via a hand-held computing device are schematically illustrated. Initially, a file is selected from among a plurality of hierarchically-related files within a web site (Block 100). Files may include web pages and files displayed within web pages, such as image files.

The selected file and files hierarchically-related to the selected file are then analyzed to identify those files having one or more characteristics that can hinder or prohibit the display thereof via a hand-held computing device display (Block 200). For example, the size, font, style and language of text within a web page can be analyzed (Block 210, FIG. 1B). Also, the format and size of image files can be analyzed (Block 220, FIG. 1B).

Preferably, the selected file and files hierarchically-related to the selected file are analyzed via a web crawler (also referred to as a "spider" or a "bot"). As is known by those skilled in this art, a web crawler is configured to read a web page, and then follow links contained therewithin to other web pages within the web site and/or external to the web site.

A web crawler utilized to implement the present invention is specially configured to identify particular characteristics of a file. For example, a web crawler can be configured to analyze the size, style, font and language of text within a file. In addition, a web crawler can be configured to analyze the format and size of image files. Preferably, when a file is visited by a web crawler according to the present invention, one or more programs are executed that are specifically written to look for particular characteristics of the file that may be problematic when the file is displayed within a hand-held device display.

A particularly preferred web crawler for use in carrying out the present invention is International Business Machine Corporation's (IBM's) Mapuccino software application. Mapuccino can dynamically construct visual maps of web site content that can be viewed using a Java-enabled browser. Mapuccino can enable a user to capture and view the overall structure of a Web site, including links to other web sites, and to navigate visually through the contents of a web site.

A directed graph representation of the plurality of hierarchically-related files is displayed with each file having a characteristic that can hinder or prohibit the display thereof via a hand-held computing device display identified (Block 300). Preferably, the type of each file within the directed graph representation is identified (Block 310, FIG. 1C). In addition, a URL associated with a respective file displayed within the directed graph representation may be identified (Block 320, FIG. 1C). The term "directed graph" is a mathematical term for a pictorial representation of a hierarchical relationship of objects. The present invention is not limited to the use of a directed graph. Other representations of hierarchically-related files may be utilized in accordance with the present invention.

Figure 2:
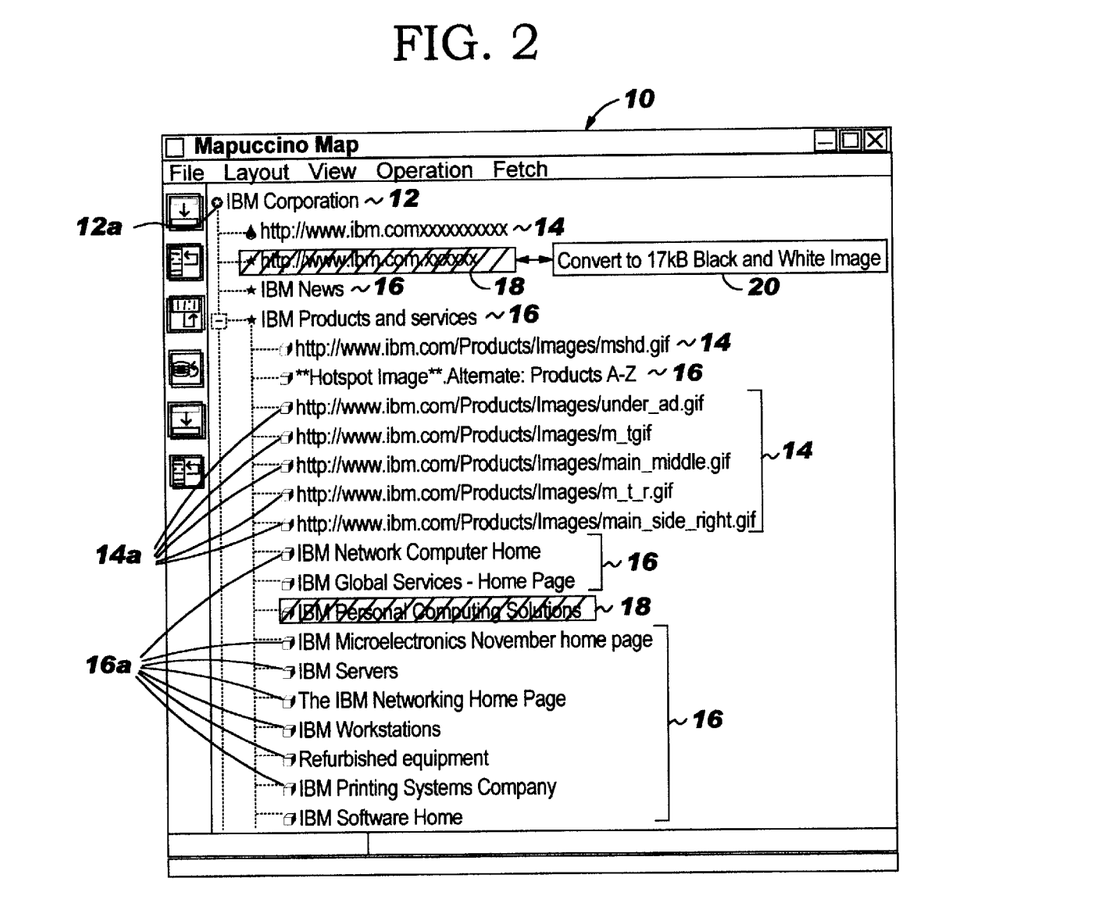
FIG. 2 illustrates a directed graph representation of a plurality of hierarchically-related files within a web site, according to the present invention.

Referring now to FIG. 2, a directed graph representation 10 of a plurality of hierarchically-related files within a web site is illustrated. The initially selected file 12 is located in the upper left-hand corner of the directed graph representation 10. Files hierarchically-related to the selected file 12 are displayed with the hierarchical relationships illustrated. The type of each illustrated file is also identified (Block 310, FIG. 1C) via icons. For example, the initially selected file 12 has a "house" icon 12*a* associated therewith. Image files 14 have a "smiley face" icon 14*a* associated therewith. Web pages in HTML format 16 have a "document" icon 16*a* associated therewith, as illustrated. In addition, a URL for each image file 14 is also displayed (Block 320, FIG. 1C).

Each file having at least one characteristic that can hinder or prohibit the display of a respective file via a hand-held device display is identified (Block 300, FIG. 1C) in the illustrated directed graph representation via shading 18. Accordingly, the present invention can allow a web administrator to easily identify files requiring content transformation in order to be displayable via a hand-held computing device.

Preferably, a description of how to transform an identified file so as to be displayable via a hand-held device is displayed to a user (Block 400, FIG. 1A), either via the directed graph representation 10, or otherwise. For example, in FIG. 2 a description 20 of how to transform one of the identified files 18 so as to be displayable via a hand-held device is displayed within the directed graph representation 10. Alternatively, Web content transformation may be performed automatically when a file having a particular characteristic is identified. Web content transformation is understood by those skilled in this art, and need not be described further herein.

A file may reside within a web site in more than one format. For example, a first image file for a particular image may be configured for display via a desktop computer monitor. A second image file for the same image may be configured for display via a hand-held computing device. Preferably, a web server receiving a request for the image is capable of determining what type of client device is making the request so that the correct file can be served.

Figure 3:
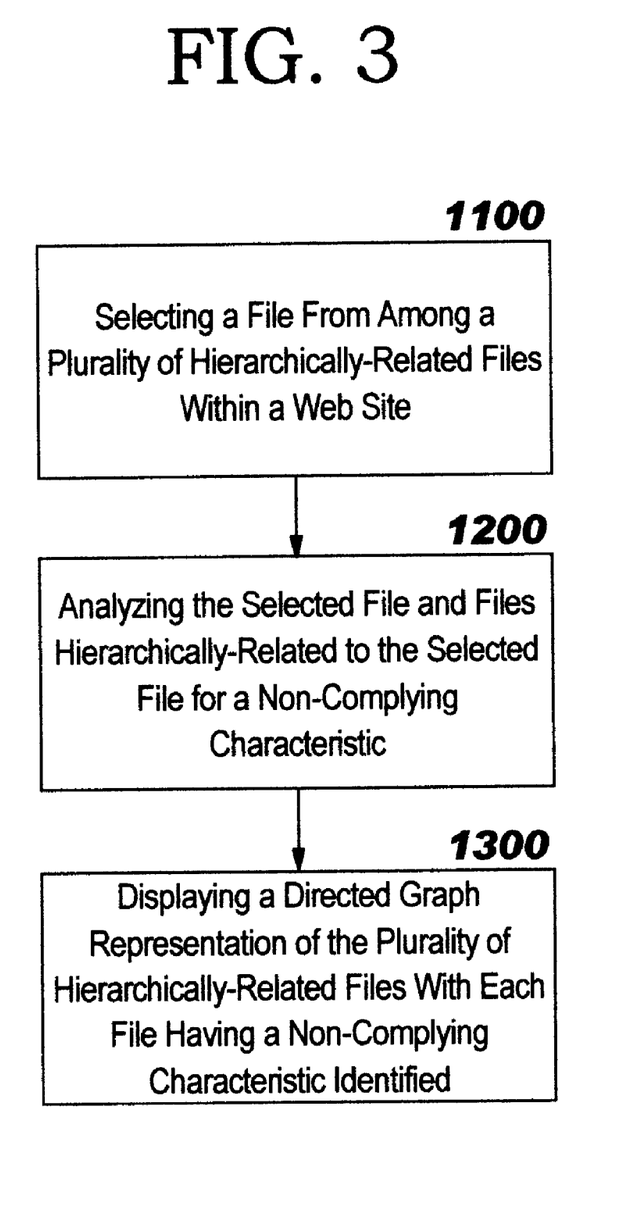
FIG. 3 schematically illustrates operations according to the present invention for identifying files from a plurality of hierarchically-related files within a web site wherein each identified file has at least one noncomplying characteristic.

The present invention may also be utilized to determine whether all files within a web site comply with the same style and/or format. For example, using the present invention, a determination can be made whether all web pages within a web site contain text in English. As illustrated in FIG. 3, a file is selected from among a plurality of hierarchically-related files within a web site (Block 1100). The selected file and files hierarchically-related to the selected file are then analyzed to identify files having one or more non-complying characteristics (Block 1200). For example, all files not containing text in English can be identified. Each file having a non-complying characteristic is identified within a directed graph representation of the plurality of hierarchically-related files (Block 1300). Accordingly, a web administrator can easily identify files containing a one or more non-complying characteristics.

Figure 4:
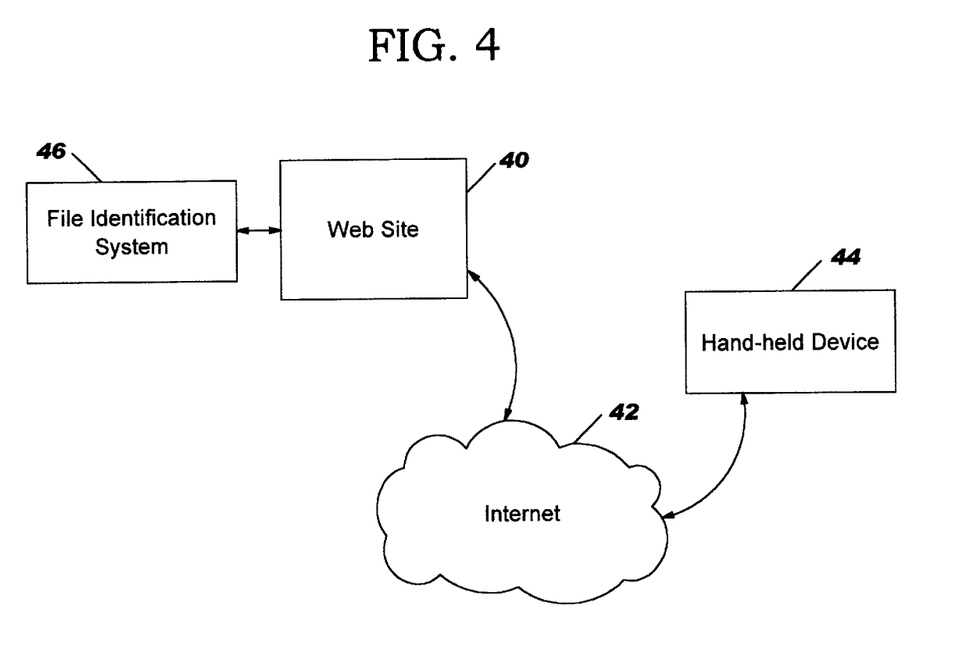
FIG. 4 schematically illustrates a system for carrying out the present invention.

Referring now to FIG. 4, a system for carrying out aspects of the present invention is schematically illustrated. A web site 40 containing a plurality of hierarchically-related files is connected to a computer network 42, such as the Internet. A hand-held computing device 44 is configured to communicate with, and receive files from, the web site 40 via the Internet 42. A data processing system containing a file identification system 46 according to the present invention is in communication with the web site 40 as illustrated. It is understood that the data processing system could be configured to communicate with the web site 40 via the Internet 42 or via another computer network.

The file identification system 46 provides means for selecting a file from among the plurality of hierarchically-related files contained within the web site 40. The file identification system 46 also provides means for analyzing a selected file and files hierarchically-related to the selected file for one or more characteristics that can hinder display thereof via the hand-held computing device 44, or for various non-complying characteristics. Furthermore, the file identification system 46 provides means for displaying a directed graph representation of the plurality of hierarchically-related files. Each file having a non-complying characteristic and/or a characteristic that can hinder display thereof via a hand-held computing device is identified within a directed graph displayed via the data processing system.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other That which is claimed is:

1. A method of identifying files from among a plurality of hierarchically-related files within a web site, wherein each of the identified files has at least one characteristic that can hinder display thereof via a hand-held computing device in communication with the web site, the method comprising the following steps that are performed in a data processing system in communication with the web site:

selecting a file from among the plurality of hierarchically-related files;

analyzing the selected file and files hierarchically-related to the selected file for at least one characteristic that can hinder display thereof via a hand-held computing device; and displaying a directed graph representation of the plurality of hierarchically-related files, wherein each file having at least one characteristic that can hinder display thereof via a hand-held computing device is identified.

2. A method according to claim 1 wherein the plurality of hierarchically-related files comprise web pages and files displayed within web pages.

3. A method according to claim 2 wherein the step of analyzing the selected file and files hierarchically-related to the selected file for at least one characteristic that hinders display via a hand-held computing device is performed by a web crawler.

4. A method according to claim 1 wherein the step of analyzing the selected file and files hierarchically-related to the selected file for at least one characteristic that can hinder display thereof via a hand-held computing device comprises analyzing the selected file and files hierarchically-related to the selected file for a plurality of characteristics that can hinder display thereof via a hand-held computing device.

5. A method according to claim 1 wherein the step of analyzing the selected file and files hierarchically-related to the selected file for at least one characteristic that can hinder display thereof via a hand-held computing device comprises analyzing text for at least one of size, style, font and language.

6. A method according to claim 1 wherein the step of analyzing the selected file and files hierarchically-related to the selected file for at least one characteristic that can hinder display thereof via a hand-held computing device comprises analyzing image files for format and size.

7. A method according to claim 1 further comprising the step of displaying within the directed graph representation a description of how to transform an identified file so as to be displayable via a hand-held computing device.

8. A method according to claim 1 wherein the step of displaying a directed graph representation of the plurality of hierarchically-related files comprises identifying a file type for a respective file.

9. A method according to claim 1 wherein the step of displaying a directed graph representation of the plurality of hierarchically-related files comprises displaying a URL associated with a respective file.

10. A method of identifying files from among a plurality of hierarchically-related files within a web site, wherein each of the identified files has at least one characteristic that can hinder display thereof via a hand-held computing device in communication with the web site, the method comprising the following steps that are performed in a data processing system in communication with the web site:

selecting a file from among the plurality of hierarchically-related files;

analyzing the selected file and files hierarchically-related to the selected file for at least one characteristic that can hinder display thereof via a hand-held computing device;

displaying a directed graph representation of the plurality of hierarchically-related files, wherein each file having at least one characteristic that can hinder display thereof via a hand-held computing device is identified;

identifying a file type for each respective identified file;

displaying a uniform resource locator (URL) associated with each respective identified file; and displaying within the directed graph representation a description of how to transform an identified file so as to be displayable via a hand-held computing device.

11. A method according to claim 10 wherein the plurality of hierarchically-related files comprise web pages and files displayed within web pages.

12. A method according to claim 11 wherein the step of analyzing the selected file and files hierarchically-related to the selected file for at least one characteristic that hinders display via a hand-held computing device is performed by a web crawler.

13. A method according to claim 10 wherein the step of analyzing the selected file and files hierarchically-related to the selected file for at least one characteristic that can hinder display thereof via a hand-held computing device comprises analyzing the selected file and files hierarchically-related to the selected file for a plurality of characteristics that can hinder display thereof via a hand-held computing device.

14. A method according to claim 10 wherein the step of analyzing the selected file and files hierarchically-related to the selected file for at least one characteristic that can hinder display thereof via a hand-held computing device comprises analyzing text for at least one of size, style, font and language.

15. A method according to claim 10 wherein the step of analyzing the selected file and files hierarchically-related to the selected file for at least one characteristic that can hinder display thereof via a hand-held computing device comprises analyzing image files for format and size.

16. A system for identifying files from among a plurality of hierarchically-related files within a web site, wherein each of the identified files has at least one characteristic that can hinder display thereof via a hand-held computing device in communication with the web site, comprising:

means for selecting a file from among the plurality of hierarchically-related files;

means for analyzing the selected file and files hierarchically-related to the selected file for at least one characteristic that can hinder display thereof via a hand-held computing device; and means for displaying a directed graph representation of the plurality of hierarchically-related files, wherein each file having at least one characteristic that can hinder display thereof via a hand-held computing device is identified.

17. A system according to claim 16 wherein the plurality of hierarchically-related files comprise web pages and files displayed within web pages.

18. A system according to claim 17 wherein the means for analyzing the selected file and files hierarchically-related to the selected file for at least one characteristic that hinders display via a hand-held computing device comprises a web crawler.

19. A system according to claim 16 wherein the means for analyzing the selected file and files hierarchically-related to the selected file for at least one characteristic that can hinder display thereof via a hand-held computing device comprises means for analyzing the selected file and files hierarchically-related to the selected file for a plurality of characteristics that can hinder display thereof via a hand-held computing device.

20. A system according to claim 16 wherein the means for analyzing the selected file and files hierarchically-related to the selected file for at least one characteristic that can hinder display thereof via a hand-held computing device comprises means for analyzing text for at least one of size, style, font and language.

21. A system according to claim 16 wherein the means for analyzing the selected file and files hierarchically-related to the selected file for at least one characteristic that can hinder display thereof via a hand-held computing device comprises means for analyzing image files for format and size.

22. A system according to claim 16 further comprising means for displaying within the directed graph representation a description of how to transform an identified file so as to be displayable via a hand-held computing device.

23. A system according to claim 16 wherein the means for displaying a directed graph representation of the plurality of hierarchically-related files comprises means for identifying a file type for a respective file.

24. A system according to claim 16 wherein the means for displaying a directed graph representation of the plurality of hierarchically-related files comprises means for displaying a URL associated with a respective file.

25. A system for identifying files from among a plurality of hierarchically-related files within a web site, wherein each of the identified files has at least one characteristic that can hinder display thereof via a hand-held computing device in communication with the web site, comprising:

means for selecting a file from among the plurality of hierarchically-related files;

means for analyzing the selected file and files hierarchically-related to the selected file for at least one characteristic that can hinder display thereof via a hand-held computing device;

means for displaying a directed graph representation of the plurality of hierarchically-related files, wherein each file having at least one characteristic that can hinder display thereof via a hand-held computing device is identified;

means for identifying a file type for each respective identified file;

means for displaying a uniform resource locator (URL) associated with each respective identified file; and means for displaying within the directed graph representation a description of how to transform an identified file so as to be displayable via a hand-held computing device.

26. A system according to claim 25 wherein the plurality of hierarchically-related files comprise web pages and files displayed within web pages.

27. A system according to claim 26 wherein the means for analyzing the selected file and files hierarchically-related to the selected file for at least one characteristic that hinders display via a hand-held computing device comprises a web crawler.

28. A system according to claim 25 wherein the means for analyzing the selected file and files hierarchically-related to the selected file for at least one characteristic that can hinder display thereof via a hand-held computing device comprises means for analyzing the selected file and files hierarchically-related to the selected file for a plurality of characteristics that can hinder display thereof via a hand-held computing device.

29. A system according to claim 25 wherein the means for analyzing the selected file and files hierarchically-related to the selected file for at least one characteristic that can hinder display thereof via a hand-held computing device comprises means for analyzing text for at least one of size, style, font and language.

30. A system according to claim 25 wherein the means for analyzing the selected file and files hierarchically-related to the selected file for at least one characteristic that can hinder display thereof via a hand-held computing device comprises means for analyzing image files for format and size.

31. A computer program product for identifying files from among a plurality of hierarchically-related files within a web site, wherein each of the identified files has at least one characteristic that can hinder display thereof via a hand-held computing device in communication with the web site, the computer program product comprising a computer usable storage medium having computer readable program code means embodied in the medium, the computer readable program code means comprising:

computer readable program code means for selecting a file from among the plurality of hierarchically-related files;

computer readable program code means for analyzing the selected file and files hierarchically-related to the selected file for at least one characteristic that can hinder display thereof via a hand-held computing device; and computer readable program code means for displaying a directed graph representation of the plurality of hierarchically-related files, wherein each file having at least one characteristic that can hinder display thereof via a hand-held computing device is identified.

32. A computer program product according to claim 31 wherein the plurality of hierarchically-related files comprise web pages and files displayed within web pages.

33. A computer program product according to claim 32 wherein the computer readable program code means for analyzing the selected file and files hierarchically-related to the selected file for at least one characteristic that hinders display via a hand-held computing device comprises a web crawler.

34. A computer program product according to claim 31 wherein the computer readable program code means for analyzing the selected file and files hierarchically-related to the selected file for at least one characteristic that can hinder display thereof via a hand-held computing device comprises computer readable program code means for analyzing the selected file and files hierarchically-related to the selected file for a plurality of characteristics that can hinder display thereof via a hand-held computing device.

35. A computer program product according to claim 31 wherein the computer readable program code means for analyzing the selected file and files hierarchically-related to the selected file for at least one characteristic that can hinder display thereof via a hand-held computing device comprises computer readable program code means for analyzing text for at least one of size, style, font and language.

36. A computer program product according to claim 31 wherein the computer readable program code means for analyzing the selected file and files hierarchically-related to the selected file for at least one characteristic that can hinder display thereof via a hand-held computing device comprises computer readable program code means for analyzing image files for format and size.

37. A computer program product according to claim 31 further comprising computer readable program code means for displaying within the directed graph representation a description of how to transform an identified file so as to be displayable via a hand-held computing device.

38. A computer program product according to claim 31 wherein the computer readable program code means for displaying a directed graph representation of the plurality of hierarchically-related files comprises computer readable program code means for identifying a file type for a respective file.

39. A computer program product according to claim 31 wherein the computer readable program code means for displaying a directed graph representation of the plurality of hierarchically-related files comprises computer readable program code means for displaying a URL associated with a respective file.

40. A computer program product for identifying files from among a plurality of hierarchically-related files within a web site, wherein each of the identified files has at least one characteristic that can hinder display thereof via a hand-held computing device in communication with the web site, the computer program product comprising a computer usable storage medium having computer readable program code means embodied in the medium, the computer readable program code means comprising:

computer readable program code means for selecting a file from among the plurality of hierarchically-related files;

computer readable program code means for analyzing the selected file and files hierarchically-related to the selected file for at least one characteristic that can hinder display thereof via a hand-held computing device;

computer readable program code means for displaying a directed graph representation of the plurality of hierarchically-related files, wherein each file having at least one characteristic that can hinder display thereof via a hand-held computing device is identified;

computer readable program code means for identifying a file type for each respective identified file;

computer readable program code means for displaying a uniform resource locator (URL) associated with each respective identified file; and computer readable program code means for displaying within the directed graph representation a description of how to transform an identified file so as to be displayable via a hand-held computing device.

41. A computer program product according to claim 40 wherein the plurality of hierarchically-related files comprise web pages and files displayed within web pages.

42. A computer program product according to claim 41 wherein the computer readable program code means for analyzing the selected file and files hierarchically-related to the selected file for at least one characteristic that hinders display via a hand-held computing device comprises a web crawler.

43. A computer program product according to claim 40 wherein the computer readable program code means for analyzing the selected file and files hierarchically-related to the selected file for at least one characteristic that can hinder display thereof via a hand-held computing device comprises computer readable program code means for analyzing the selected file and files hierarchically-related to the selected file for a plurality of characteristics that can hinder display thereof via a hand-held computing device.

44. A computer program product according to claim 40 wherein the computer readable program code means for analyzing the selected file and files hierarchically-related to the selected file for at least one characteristic that can hinder display thereof via a hand-held computing device comprises computer readable program code means for analyzing text for at least one of size, style, font and language.

45. A computer program product according to claim 40 wherein the computer readable program code means for analyzing the selected file and files hierarchically-related to the selected file for at least one characteristic that can hinder display thereof via a hand-held computing device comprises computer readable program code means for analyzing image files for format and size.

* * * * *